Figure 1:
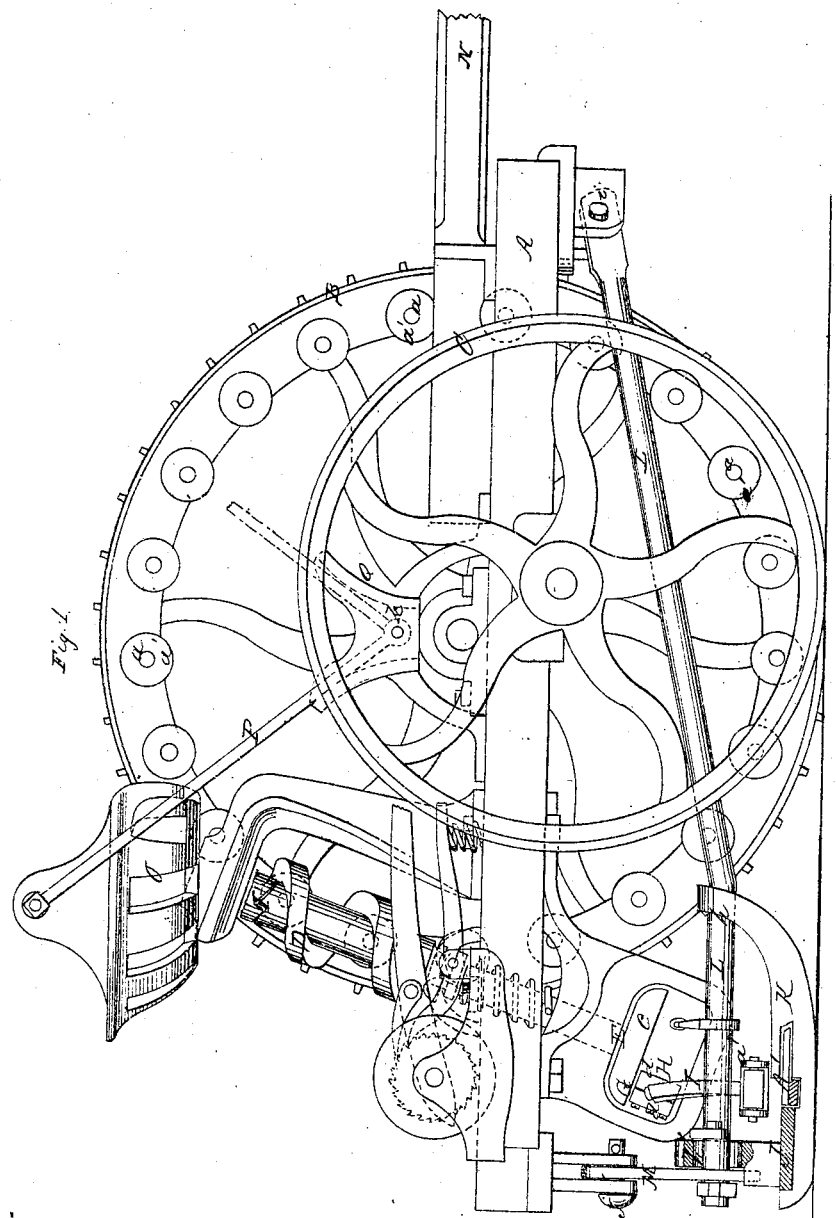

E. P. Russell.
Mower.

Nº 2708
Nº 33712

Patented Nov. 12, 1861.

Witnesses
J. W. Coombs
G. W. Reed

Inventor
E. P. Russell
per Munn & Co.
Attorneys

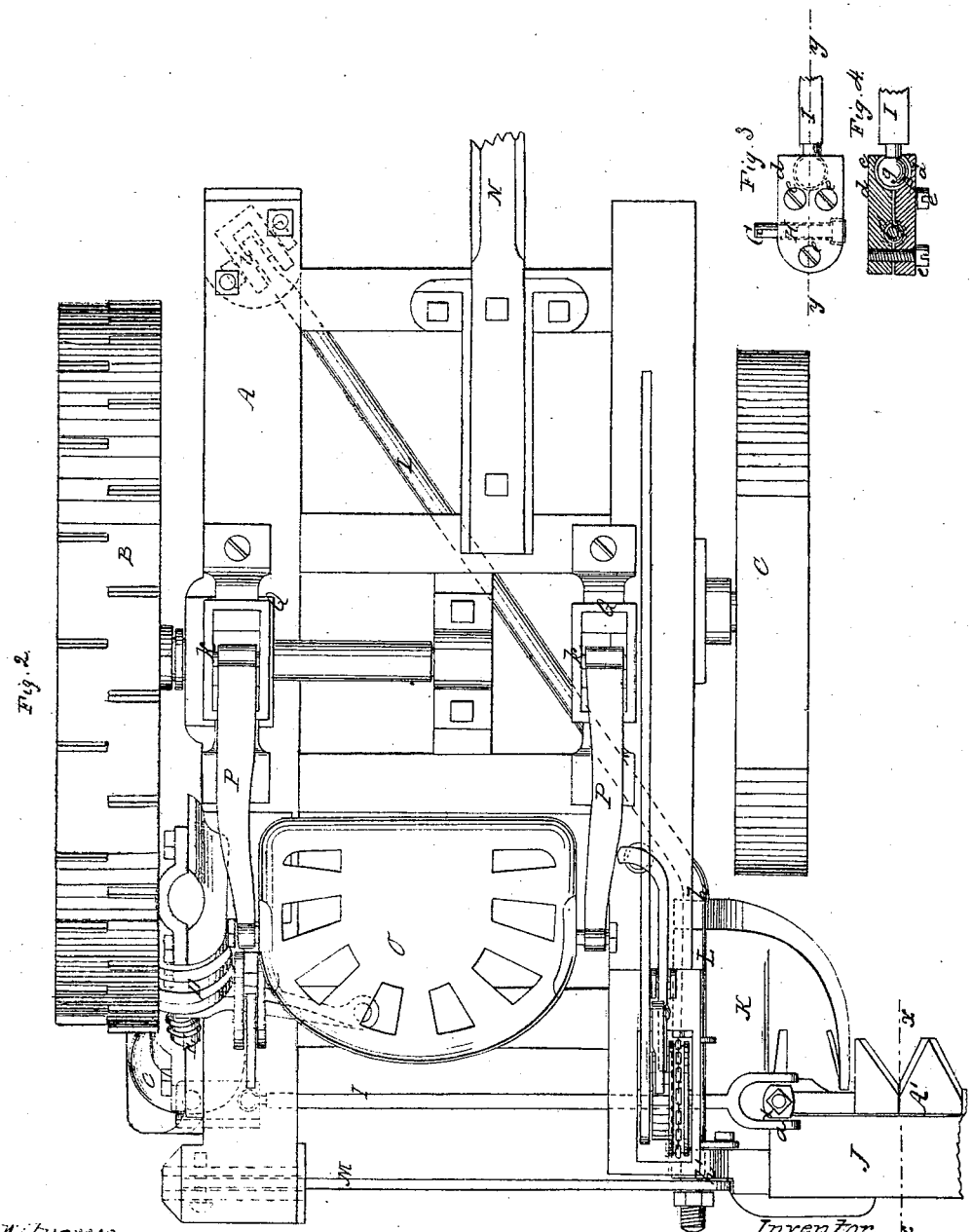

United States Patent Office.

E. P. RUSSELL, OF MANLIUS, NEW YORK.

IMPROVEMENT IN HARVESTERS.

Specification forming part of Letters Patent No. 33,712, dated November 12, 1861.

*To all whom it may concern:*

Be it known that I, E. P. RUSSELL, of Manlius, in the county of Onondaga and State of New York, have invented certain new and useful Improvements in Harvesters; and I do hereby declare that the following is a full, clear, and exact description of the same, reference being had to the accompanying drawings, making a part of this specification, in which—

Figure 1 is a side view of my invention, the finger-bar and sickle being bisected, as indicated by the line $x\,x$, Fig. 2; Fig. 2, a plan or top view of the same; Fig. 3, a detached side view of the coupling-box which connects the driving-rod of the sickle with the crank-shaft; Fig. 4, a section of Fig. 3, taken in the line $y\,y$.

Similar letters of reference indicate corresponding parts in the several figures.

This invention relates, first, to an improved mode of attaching the finger-bar to the main frame of the machine, whereby the finger-bar and sickle are allowed, as the machine is drawn along, to conform perfectly to the inequalities of the surface of the ground and the side draft in a great measure prevented or obviated.

The invention further relates to an improved arrangement of the driver's seat, as hereinafter described, whereby the same may be adjusted to compensate for the different adjustments of the finger-bar and the machine kept in a nearly-balanced state on its axles at all times.

The invention also consists in a new combination hereinafter described, by which the working parts are automatically thrown out of gear on backing the machine.

To enable those skilled in the art to fully understand and construct my invention, I will proceed to describe it.

A represents the main frame of the machine, which may be of rectangular form and mounted on two wheels, B C, which are on independent or separate axles. B is the driving-wheel, which is provided with a series of pins, $a$, at its inner side, having friction-rollers $a'$ on them, which rollers act upon a screw, D, on the upper end of a shaft, E, said screw being fitted loosely on shaft E and allowed to turn freely on it in a backward direction, but being connected with shaft E, when turning in an opposite direction, by means of a clutch, F. The shaft E is the driving-shaft, and is rotated as the machine is drawn along by the action of the rollers $a'$ on the screw.

$s$ is a spiral spring encircling the shaft E, and operating to press the screw-sleeve D upward, so as to hold the clutch F in gear. In backing the machine the downward pressure of the rollers $a'$ upon the screw, overcoming the power of the spring $s$, disconnects the clutch F, which, as well as the oblique form of the teeth of the clutch, prevents the motion of the screw from being communicated to the shaft E. When it is desired to move the machine from place to place without working the sickle the screw D is held down by a suitable lever to keep the clutch out of gear. The use of an endless screw to transmit motion to the sickle from pins upon the driving-wheel is in itself an old device, and therefore does not require a more minute description.

To the lower end of the shaft E there is attached a circular hub, $c$, which has a crank-pin, G, depending from it, and on this crank-pin G a box, H, is fitted. The box H is composed of two longitudinal parts, $d\,d$, secured together by screws $e$, each part $d$ having a groove made vertically in it, of semicircular form in its transverse section, said grooves forming, when the parts $d\,d$ are connected together, a recess to receive the crank-pin G. (See Fig. 4.) In each part $d$ of the box H there is also made a semi-spherical opening, $f$. These two openings, when the parts $d\,d$ are in contact, form a hollow sphere or spherical socket to receive a ball, $g$, at the inner end of a connecting or driving rod, I, as shown clearly in Fig. 4. The outer end of the connecting-rod, I, is attached by a universal joint, $a^\times$, to the sickle A', which is placed on the finger-bar and may be arranged as usual.

J represents the finger-bar of the machine. This finger-bar may be constructed in the usual or any proper way, and it has a shoe K, attached to its inner end. This shoe K is provided with two eyes, $h\,h'$, one, $h$, being at the front and the other, $h'$, being at the back part of the shoe. The shoe is fitted on a rod, L, the front part of which extends diagonally underneath the frame A, and is attached to its front left-hand corner by a joint or pin, $i$. The back eye, $h'$, of the shoe K is oblong, as shown in Fig. 1, so as to admit of a vertical play of the back part of the shoe, finger-bar, and platform when the latter is used. The part of the rod L on which the shoe K is fitted is parallel with the sides of the frame A, and the back end of said rod is connected to or fitted on a bar, M, the outer end of which is attached by a joint or pin, $j$, to the frame A. This arrangement, it will be seen, admits of the finger-bar J rising and falling at either end, and at the same time the oblique rod L serves to counteract side draft, as its front end is attached to the frame A at the left side of the draft-pole N, as shown clearly in Fig 2. The finger-bar J may be elevated so as to be entirely free from the surface of the ground and rest against the frame A. The finger-bar is placed in this position when the machine is being drawn from place to place, and when the finger-bar is in this position the back part of the machine will be heavier than when the finger-bar is down in a vertical position. To counteract this additional weight at the back part of the machine, I place the driver's seat O on bars P P, the lower ends of which are secured by joints or pins $k$ in sockets Q on the frame A. This arrangement admits of the seat O being adjusted in two different positions—a backward position, as shown clearly in Fig. 1, where the bars P rest against the back part of the sockets, and a forward position, when said bars rest against the front part of the sockets, as shown by the dotted lines in Fig. 1. When the finger-bar J is down in a horizontal or working position the seat O is adjusted in a backward position, in order that the machine may be properly balanced, and when the finger-bar is elevated the seat O is adjusted in a forward position, in order to counteract the additional weight to which the back part of the frame A is subjected.

I do not claim broadly the attaching of the finger-bar J to the main frame A by means of jointed bars to admit of the folding upward or elevating of the finger-bar, as well as the yielding or elevating movement at both ends of the same, for this has been previously done; but,

Having thus described my invention, what I do claim as new, and desire to secure by Letters Patent, is—

1. The attaching of the finger-bar J to the main frame A by means of the shoe K, provided with two eyes, $h\ h'$, which are fitted on the oblique or diagonal draw-bar L, the front end of which is connected by a joint or pin to the front left-hand corner of the frame A, and the back end fitted in a bar, M, the outer end of which is attached by a joint or pin, $j$, to the back part of frame A, substantially as and for the purpose set forth.

2. In combination with a shoe, K, and draw-bar L, constructed and connected as hereinbefore explained, elongating the rear eye, $h'$, of the said shoe in a vertical direction to admit of a certain degree of play of the back part of the shoe and finger-bar and also of the platform when used.

3. Attaching the driver's seat O to bars P P, which are fitted at their lower ends in sockets Q Q, attached to the frame A, and arranged substantially as and for the purpose set forth.

4. Transmitting motion to the sickle through the medium of a screw-sleeve D, adapted to be automatically thrown out of gear with its shaft by a backward motion of the machine, substantially as explained.

E. P. RUSSELL.

Witnesses:
  PORTER TREMAIN,
  AUGS. TREMAIN.